(12) United States Patent
Saadi et al.

(10) Patent No.: US 12,245,346 B2
(45) Date of Patent: Mar. 4, 2025

(54) LIGHTING FIXTURE TIME DETERMINATION SYSTEM AND METHOD

(71) Applicant: Tondo Smart LTD., Or Yehuda (IL)

(72) Inventors: Guy Saadi, Or Yehuda (IL); Micha Ben-Ezra, Or Yehuda (IL); Eliav Gnessin, Or Yehuda (IL); Philip Desautels, Or Yehuda (IL)

(73) Assignee: TONDO SMART LTD., Or Yehuda (IL)

( * ) Notice: Subject to any disclaimer, the term of this patent is extended or adjusted under 35 U.S.C. 154(b) by 338 days.

(21) Appl. No.: 17/760,306

(22) PCT Filed: Feb. 9, 2021

(86) PCT No.: PCT/IL2021/050154
§ 371 (c)(1),
(2) Date: Aug. 8, 2022

(87) PCT Pub. No.: WO2021/161306
PCT Pub. Date: Aug. 19, 2021

(65) Prior Publication Data
US 2023/0069889 A1 Mar. 9, 2023

Related U.S. Application Data

(60) Provisional application No. 62/975,222, filed on Feb. 12, 2020.

(51) Int. Cl.
*H05B 47/10* (2020.01)
*H05B 47/16* (2020.01)

(52) U.S. Cl.
CPC .................. *H05B 47/16* (2020.01)

(58) Field of Classification Search
CPC ......... H05B 47/10; H05B 47/16; H05B 45/00
See application file for complete search history.

(56) References Cited

U.S. PATENT DOCUMENTS

| | | | |
|---|---|---|---|
| 2009/0129067 A1* | 5/2009 | Fan | F21V 23/0435 362/183 |
| 2015/0156388 A1 | 6/2015 | Neglur | |
| 2016/0295658 A1* | 10/2016 | Chraibi | F21V 19/006 |
| 2017/0231053 A1* | 8/2017 | Underwood | G06V 20/52 |
| 2019/0253458 A1 | 8/2019 | Gnessin et al. | |

FOREIGN PATENT DOCUMENTS

WO 2018172786 A1 9/2018

* cited by examiner

*Primary Examiner* — Jimmy T Vu
(74) *Attorney, Agent, or Firm* — S. J. INTELLECTUAL PROPERTY; Avi Jencmen

(57) ABSTRACT

A lighting fixture comprising a processing circuitry configured to: determine a current time using a fallback time determination method upon one or more preceding time determination methods failings, the fallback time determination method being different than the preceding time determination methods; and perform a time-based operation on one or more light sources of the lighting fixture upon one or more rules that designate times for performing the time-based operation being met by the determined current time.

18 Claims, 2 Drawing Sheets

LIGHTING FIXTURE TIME DETERMINATION SYSTEM AND METHOD

TECHNICAL FIELD

The invention relates to a lighting fixture time determination system and method.

BACKGROUND

In recent years, urban areas are becoming smarter, as many electronic devices operated by municipalities, for example, become "connected". A connected device is a physical object that can connect with other physical objects and/or with other systems, over the Internet. One example of such a connected device is a lighting fixture such as a street light.

Some connected devices have functionalities that depend on time. For example, a lighting fixture can be programmed to activate its light source at a certain time in the evening (e.g. at dusk), and deactivate its light source at a certain time in the morning (e.g. at dawn). Accordingly, the lighting fixture's time determination capabilities are crucial for its operation.

In many cases, lighting fixtures, or other types of connected devices that are required to perform time-based operations, depend on a single source of time determination. In such cases, when such source of time determination is unavailable, the operation of such connected devices is negatively affected.

There is thus a need in the art for a new lighting fixture time determination system and method.

General Description

In accordance with a first aspect of the presently disclosed subject matter, there is provided a lighting fixture comprising a processing circuitry configured to: determine a current time using a fallback time determination method upon one or more preceding time determination methods failings, the fallback time determination method being different than the preceding time determination methods; and perform a time-based operation on one or more light sources of the lighting fixture upon one or more rules that designate times for performing the time-based operation being met by the determined current time.

In some cases, the fallback time determination method is one of the following: obtaining the current time from a cloud-based service; obtaining the current time from a cellular-network based service; obtaining the current time from a Global Positioning System (GPS) signal received by a OPS receiver of the lighting fixture: obtaining the current time from a Real-Time-Clock (RTC) connected to the processing circuitry; obtaining the current time from an external device, external to the lighting fixture, over a connection established between the lighting fixture and the external device via a network interface of the lighting fixture; or obtaining the current time from a backup clock, wherein a time of the backup clock is updated based on one or more ambient light measurements acquired by an ambient light sensor connected to the lighting fixture and configured to sense a current amount of ambient light.

In some cases, the processing circuitry is further configured to: obtain: (a) a current date, and (b) expected amounts of ambient light at the one or more respective known times at a geographical location of the lighting fixture; determine, using the ambient light sensor, the current amount of ambient light, and upon the current amount of ambient light being equal to, or within a first threshold from, one of the expected amounts of ambient light set the time of the backup clock to be the respective known time.

In some cases, the processing circuitry is further configured to determine the current date by: obtaining (a) a day lengths table indicative of lengths of days at known dates at the geographical location of the lighting fixture, and (b) a sequence of measurements acquired by the ambient light sensor, each indicating a respective amount of ambient light determined by the ambient light sensor at a corresponding timestamp; identifying, within the sequence of measurements: (a) a first change of a trend in the measurements indicative of occurrence of a first sunrise, the first change starting at a first timestamp being the timestamp of the earliest measurement associated with the first change; (b) a second change of a trend in the measurements indicative of occurrence of first sunset, adjacent to the first change, the second change starting at a second timestamp being the timestamp of the earliest measurement associated with the second change; (c) a third change of a trend in the measurements indicative of occurrence of a second sunrise, the third change starting at a third timestamp being the timestamp of the earliest measurement associated with the third change; (d) a fourth change of a trend in the measurements indicative of occurrence of second sunset, adjacent the third change, the fourth change starting at a fourth timestamp being the timestamp of the earliest measurement associated with the fourth change; determining (a) a first length of day, being the difference between the second timestamp and the first timestamp, and (b) a second length of day, being the difference between the fourth timestamp and the third timestamp; and determining the current date by comparing the first length of day and the second length of day with the day lengths table.

In some cases, the known times include one or more of: sunrise time, dawn time, sunset time, or dusk time.

In some cases, the processing circuitry is further configured to: obtain: (a) dawn time and dusk time at a current date at a geographical location of the lighting fixture, and (b) a sequence of measurements acquired by the ambient light sensor, each 13 indicating a respective amount of ambient light determined by the ambient light sensor at a corresponding timestamp; identify, within the sequence of measurements a change of a trend; upon the trend being an increasing trend, set the time of the backup clock to be the dawn time and upon the trend being a decreasing trend, set the time of the backup clock to be the dusk time.

In some cases, the preceding time determination methods is one or more of the following: obtaining the current time from a cloud-based service; obtaining the current time from a cellular-network based service; obtaining the current time from a Global Positioning System (GPS) signal received by a GPS receiver of the lighting fixture: obtaining the current time from a Real-Time-Clock (RTC) connected to the processing circuitry; obtaining the current time from an external device, external to the lighting fixture, over a connection established between the lighting fixture and the external device via a network interface of the lighting fixture; or obtaining the current time from a backup clock, wherein a time of the backup clock is updated based on expected amounts of ambient light at one or more respective known times at the geographical location of the lighting fixture.

In some cases, the lighting fixture further comprises an ambient light sensor configured to sense a current amount of ambient light, and the processing circuitry is further configured to: obtain: (a) a current date, and (b) the expected amounts of ambient light at the one or more respective known times at the geographical location of the lighting fixture; determine, using the ambient light sensor, the current amount of ambient light; and upon the current amount of ambient light being equal to, or within a first threshold from, one of the expected amounts of ambient light set the time of the backup clock to be the respective known time.

In some cases, the known times include one or more of: sunrise time, dawn time, sunset time, or dusk time.

In some cases, the time-based operations are one or more of: turning at least one of the light sources on, turning at least one of the light sources off, increasing an amount in of light emitted by the light sources the light sources, or decreasing an amount of light emitted by the light sources the light sources.

In accordance with a second aspect of the presently disclosed subject matter, there is provided a lighting fixture comprising a processing circuitry configured to: request a current time from a cloud-based service; upon failure of the cloud-based service to provide the current time, request the current time from a cellular-network based service; upon failure of the cellular-network based service to provide the current time, obtain the current time from a Global Positioning System (GPS) signal received by a GPS receiver of the lighting fixture; upon failure of obtaining the current time from the GPS signal, obtain the current time from a Real-Time-Clock (RTC) connected to the processing circuitry; upon failure of obtaining the current time from the RTC, obtain the current time from an external device, external to the lighting fixture, over a connection established between the lighting fixture and the external device via a network interface of the lighting fixture; upon failure of obtaining the current time from the external device, obtain the current time from a backup clock, wherein a time of the backup clock is updated based on expected amounts of ambient light at one or more respective known times at the geographical location of the lighting fixture.

In some cases, the lighting fixture further comprises an ambient light sensor configured to sense a current amount of ambient light, and the processing circuitry is further configured to: obtain: (a) a current date, and (b) the expected amounts of ambient light at the one or more respective known times at the geographical location of the lighting fixture; determine, using the ambient light sensor, the current amount of ambient light; and upon the current amount of ambient light being equal to, or within a first threshold from, one of the expected amounts of ambient light set the time of the backup clock to be the respective known time.

In some cases, the known times include one or more of: sunrise time, dawn time, sunset time, or dusk time.

In some cases, the processing circuitry is further configured to perform a time-based operation on one or more light sources of the lighting fixture upon one or more rules that designate times for performing the time-based operation being met by the current time.

In some cases, the time-based operations are one or more of: turning at least one of the light sources on, turning at least one of the light sources off, increasing an amount of light emitted by the light sources the light sources, or decreasing an amount of light emitted by the light sources the light sources.

In accordance with a third aspect of the presently disclosed subject matter, there is provided a lighting fixture comprising: an internal clock; an ambient light sensor configured to sense a current amount of ambient light; and a processing circuitry configured to: obtain: (a) a current date, and (b) the expected amounts of ambient light at the one or more respective known times at the geographical location of the lighting fixture; determine, using the ambient light sensor, the current amount of ambient light; and upon the current amount of ambient light being equal to, or within a first threshold from, one of the expected amounts of ambient light set the time of the internal clock to be the respective known time.

In some cases, the known times include one or more of sunrise time, dawn time, sunset time, or dusk time.

In some cases, the internal clock is a Real-Time-Clock (RTC) connected to the processing circuitry.

In some cases, the processing circuitry is further configured to perform a time-based operation on one or more light sources of the lighting fixture upon one or more rules that designate times for performing the time-based operation being met by the time of the internal clock.

In some cases, the time-based operations are one or more of: turning at least one of the light sources on, turning at least one of the light sources off, increasing an amount of light emitted by the light sources the light sources, or decreasing an amount of light emitted by the light sources the light sources.

In accordance with a fourth aspect of the presently disclosed subject matter, there is provided a method of operating a lighting fixture, the method comprising: determining, by a processing circuitry a current time using a fallback time determination method upon one or more preceding time determination methods failings, the fallback time determination method being different than the preceding time determination methods; and performing, by the processing circuitry, a time-based operation on one or more light sources of the lighting fixture upon one or more rules that designate times for performing the time-based operation being met by the determined current time.

In some cases, the fallback time determination method is one of the following: obtaining the current time from a cloud-based service; obtaining the current time from a cellular-network based service; obtaining the current time from a Global Positioning System (GPS) signal received by a GPS receiver of the lighting fixture; obtaining the current time from a Real-Time-Clock (RTC) connected to the processing circuitry; obtaining the current time from an external device, external to the lighting fixture, over a connection established between the lighting fixture and the external device via a network interface of the lighting fixture; or obtaining the current time from a backup clock, wherein a time of the backup clock is updated based on one or more ambient light measurements acquired by an ambient light sensor connected to the lighting fixture and configured to sense a current amount of ambient light.

In some cases, the method further comprises: obtaining, by the processing circuitry: (a) a current date, and (b) expected amounts of ambient light at the one or more respective known times at a geographical location of the lighting fixture; determining, by the processing circuitry, using the ambient light sensor, the current amount of ambient light; and upon the current amount of ambient light being equal to, or within a first threshold from, one of the expected amounts of ambient light, setting, by the processing circuitry, the time of the backup clock to be the respective known time.

In some cases, the method, further comprises determining, by the processing circuitry, the current date by: obtaining (a) a day lengths table indicative of lengths of days at known dates at the geographical location of the lighting fixture, and (b) a sequence of measurements acquired by the ambient light sensor, each indicating a respective amount of ambient light determined by the ambient light sensor at a corresponding timestamp; identifying, within the sequence of measurements: a first change of a trend in the measurements indicative of occurrence of a first sunrise, the first change starting at a first timestamp being the timestamp of the earliest measurement associated with the rust change; a second change of a trend in the measurements indicative of occurrence of first sunset, adjacent to the first change, the second change starting at a second timestamp being the timestamp of the earliest measurement associated with the second change; a third change of a trend in the measurements indicative of occurrence of a second sunrise, the third change starting at a third timestamp being the timestamp of the earliest measurement associated with the third change; a fourth change of a trend in the measurements indicative of occurrence of second sunset, adjacent the third change, the fourth change starting at a fourth timestamp being the timestamp of the earliest measurement associated with the fourth change; determining (a) a first length of day, being the difference between the second timestamp and the first timestamp, and (b) a second length of day, being the difference between the fourth timestamp and the third timestamp; and determining the current date by comparing the first length of day and the second length of day with the day lengths table.

In some cases, the known times include one or more of: sunrise time, dawn time, sunset time, or dusk time.

In some cases, the method, further comprises: obtaining, by the processing circuitry: (a) dawn time and dusk time at a current date at a geographical location of the lighting fixture, and (b) a sequence of measurements acquired by the ambient light sensor, each indicating a respective amount of ambient light determined by the ambient light sensor at a corresponding timestamp: identifying, by the processing circuitry, within the sequence of measurements a change of a trend; upon the trend being an increasing trend, setting, by the processing circuitry, the time of the backup clock to be the dawn time and upon the trend being a decreasing trend, set the time of the backup clock to be the dusk time.

In some cases, the preceding time determination methods is one or more of the following: obtaining the current time from a cloud-based service; obtaining the current time from a cellular-network based service: obtaining the current time from a Global Positioning System (GPS) signal received by a GPS receiver of the lighting fixture: obtaining the current time from a Real-Time-Clock (RTC) connected to the processing circuitry; obtaining the current time from an external device, external to the lighting fixture, over a connection established between the lighting fixture and the external device via a network interface of the lighting fixture; or obtaining the current time from a backup clock, wherein a time of the backup clock is updated based on expected amounts of ambient light at one or more respective known times at the geographical location of the lighting fixture.

In some cases, the lighting fixture comprises an ambient light sensor configured to sense a current amount of ambient light, and the method further comprising: obtaining, by the processing circuitry: (a) a current date, and (b) the expected amounts of ambient light at the one or more respective known times at the geographical location of the lighting fixture; determining, by the processing circuitry, using the ambient light sensor, the current amount of ambient light; and upon the current amount of ambient light being equal to, or within a first threshold from, one of the expected amounts of ambient light, setting, by the processing circuitry, the time of the backup clock to be the respective known time.

In some cases, the known times include one or more of: sunrise time, dawn time, sunset time, or dusk time.

In some cases, the time-based operations are one or more of: turning at least one of the light sources on, turning at least one of the light sources off, increasing an amount of light emitted by the light sources the light sources, or decreasing an amount of light emitted by the light sources the light sources.

In accordance with a fifth aspect of the presently disclosed subject matter, there is provided a method of operating a lighting fixture, the method comprising: requesting, by a processing circuitry, a current time from a cloud-based service; upon failure of the cloud-based service to provide the current time, request the current time from a cellular-network based service; upon failure of the cellular-network based service to provide the current time, obtaining, by the processing circuitry, the current time from a Global Positioning System (GPS) signal received by a GPS receiver of the lighting fixture; upon failure of obtaining the current time from the GPS signal, obtaining, by the processing circuitry, the current time from a Real-Time-Clock (RTC) connected to the processing circuitry: upon failure of obtaining the current time from the RTC, obtaining, by the processing circuitry, the current time from an external device, external to the lighting fixture, over a connection established between the lighting fixture and the external device via a network interface of the lighting fixture; upon failure of obtaining the current time from the external device, obtaining, by the processing circuitry, the current time from a backup clock, wherein a time of the backup clock is updated based on expected amounts of ambient light at one or more respective known times at the geographical location of the lighting fixture.

In some cases, the lighting fixture comprises an ambient light sensor configured to sense a current amount of ambient light, and the method further comprising: obtaining, by the processing circuitry: (a) a current date, and (b) the expected amounts of ambient light at the one or more respective known times at the geographical location of the lighting fixture; determining, by the processing circuitry, using the ambient light sensor, the current amount of ambient light; and upon the current amount of ambient light being equal to, or within a first threshold from, one of the expected amounts of ambient light, setting, by the processing circuitry, the time of the backup clock to be the respective known time.

In some cases, the known times include one or more of: sunrise time, dawn time, sunset time, or dusk time.

In some cases, the method further comprises performing, by the processing circuitry, a time-based operation on one or more light sources of the lighting fixture upon one or more rules that designate times for performing the time-based operation being met by the current time.

In some cases, the time-based operations are one or more of: turning at least one of the light sources on, turning at least one of the light sources off, increasing an amount of light emitted by the light sources the light sources, or decreasing an amount of light emitted by the light sources the light sources.

In accordance with a sixth aspect of the presently disclosed subject matter, there is provided a method comprising: obtaining, by a processing circuitry: (a) a current date, and (b) the expected amounts of ambient light at the one or more respective known times at the geographical location of the lighting fixture; determining, by the processing circuitry, using an ambient light sensor comprising within a lighting fixture and configured to sense a current amount of ambient light, the current amount of ambient light; and upon the current amount of ambient light being equal to, or within a first threshold from, one of the expected amounts of ambient light, setting, by the processing circuitry, a time of an internal clock comprised within the lighting fixture to be the respective known time.

In some cases, the known times include one or more of: sunrise time, dawn time, sunset time, or dusk time.

In some cases, the internal clock is a Real-Time-Clock (RTC) connected to the processing circuitry.

In some cases, the method further comprises performing, by the processing circuitry, a time-based operation on one or more light sources of the lighting fixture upon one or more rules that designate times for performing the time-based operation being met by the time of the internal clock.

In some cases, the time-based operations are one or more of: turning at least one of the light sources on, turning at least one of the light sources off, increasing an amount of light emitted by the light sources the light sources, or decreasing an amount of light emitted by the light sources the light sources.

In accordance with a seventh aspect of the presently disclosed subject matter, there is provided a non-transitory computer readable storage medium having computer readable program code embodied therewith, the computer readable program code, executable by a processing circuitry to perform a method of operating a lighting fixture, the method comprising: determining, by the processing circuitry, a current time using a fallback time determination method upon one or more preceding time determination methods failings, the fallback time determination method being different than the preceding time determination methods; and performing, by the processing circuitry, a time-based operation on one or more light sources of the lighting fixture upon one or more rules that designate times for performing the time-based operation being met by the determined current time.

In accordance with a eighth aspect of the presently disclosed subject matter, there is provided a non-transitory computer readable storage medium having computer readable program code embodied therewith, the computer readable program code, executable by a processing circuitry to perform a method of operating a lighting fixture, the method comprising: requesting, by a processing circuitry, a current time from a cloud-based service; upon failure of the cloud-based service to provide the current time, request the current time from a cellular-network based service, upon failure of the cellular-network based service to provide the current time, obtaining, by the processing circuitry, the current time from a Global Positioning System (GPS) signal received by a GPS receiver of the lighting fixture; upon failure of obtaining the current time from the GPS signal, obtaining, by the processing circuitry, the current time from a Real-Time-Clock (RTC) connected to the processing circuitry; upon failure of obtaining the current time from the RTC, obtaining, by the processing circuitry, the current time from an external device, external to the lighting fixture, over a connection established between the lighting fixture and the external device via a network interface of the lighting fixture; upon failure of obtaining the current time from the external device, obtaining, by the processing circuitry, the current time from a backup clock, wherein a time of the backup clock is updated based on expected amounts of ambient light at one or more respective known times at the geographical location of the lighting fixture.

In accordance with a ninth aspect of the presently disclosed subject matter, there is provided a non-transitory computer readable storage medium having computer readable program code embodied therewith, the computer readable program code, executable by a processing circuitry to perform a method comprising: obtaining, by a processing circuitry: (a) a current date, and (b) the expected amounts of ambient light at the one or more respective known times at the geographical location of the lighting fixture; determining, by the processing circuitry, using an ambient light sensor comprising within a lighting fixture and configured to sense a current amount of ambient light, the current amount of ambient light; and upon the current amount of ambient light being equal to, or within a first threshold from, one of the expected amounts of ambient light, setting, by the processing circuitry, a time of an internal clock comprised within the lighting fixture to be the respective known time.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
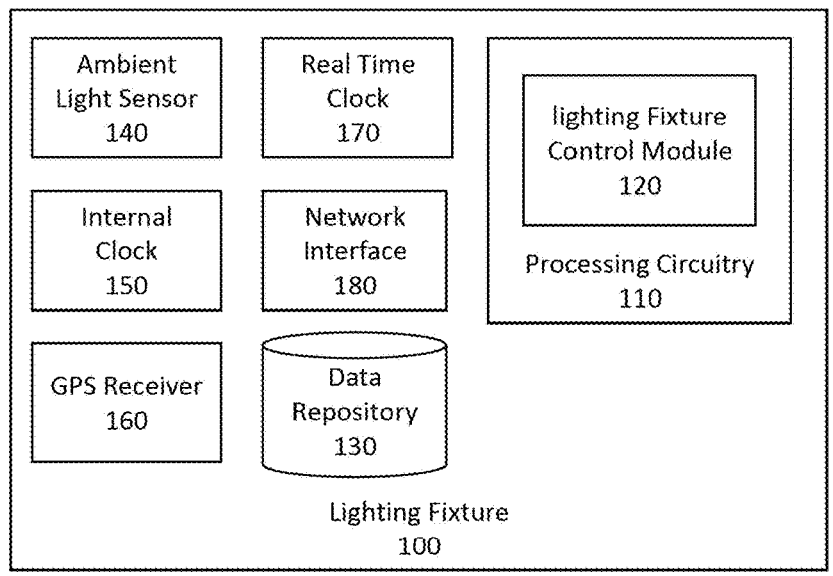
FIG. 1 is a block diagram schematically illustrating one example of a lighting fixture time determination system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "requesting", "determining", "performing", "obtaining", "setting" or the like, include action and/or processes of a computer that manipulate and/or transform data into other data, said data represented as physical quantities, e.g. such as electronic quantities, and/or said data representing the physical objects. The terms "computer". "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases". "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
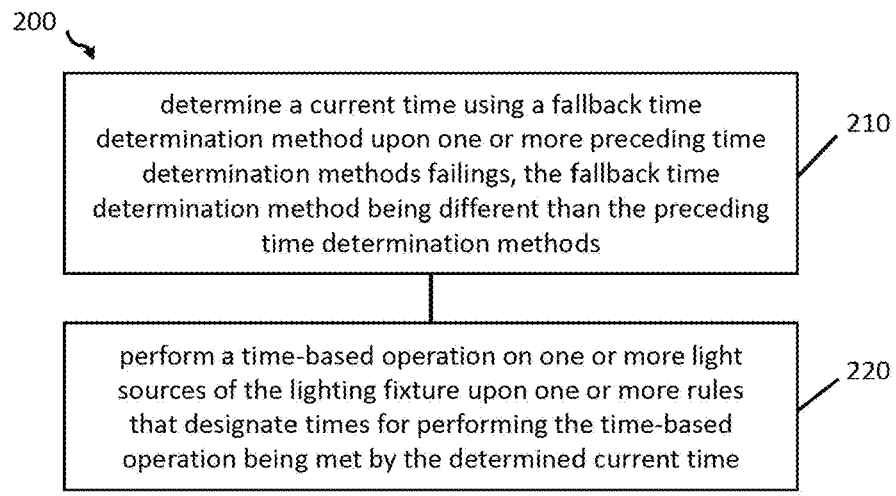
FIG. 2 is a flowchart illustrating one example of a sequence of operations carried out for controlling a lighting fixture, in accordance with the presently disclosed subject matter.
Figure 3:
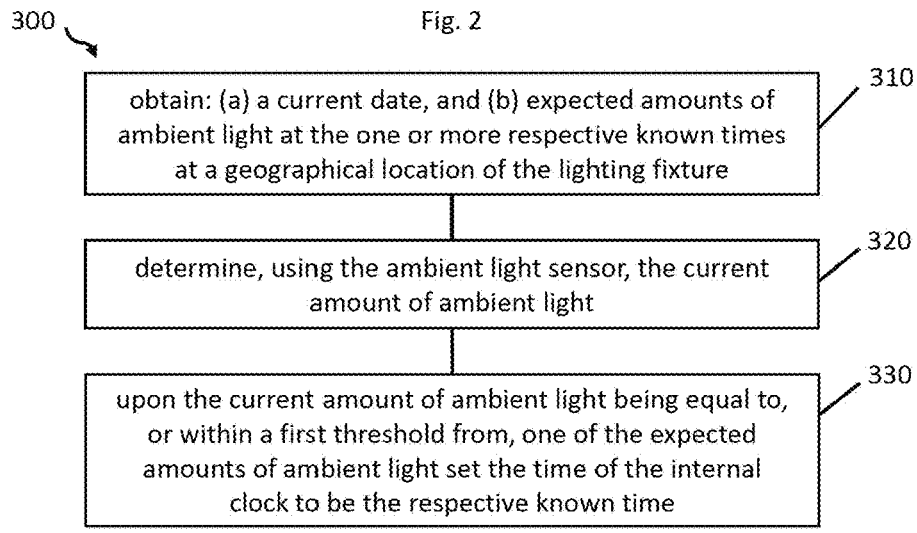
FIG. 3 is a flowchart illustrating one example of a sequence of operations carried out for determining a time using an ambient light sensor, in accordance with the presently disclosed subject matter.
Figure 4:
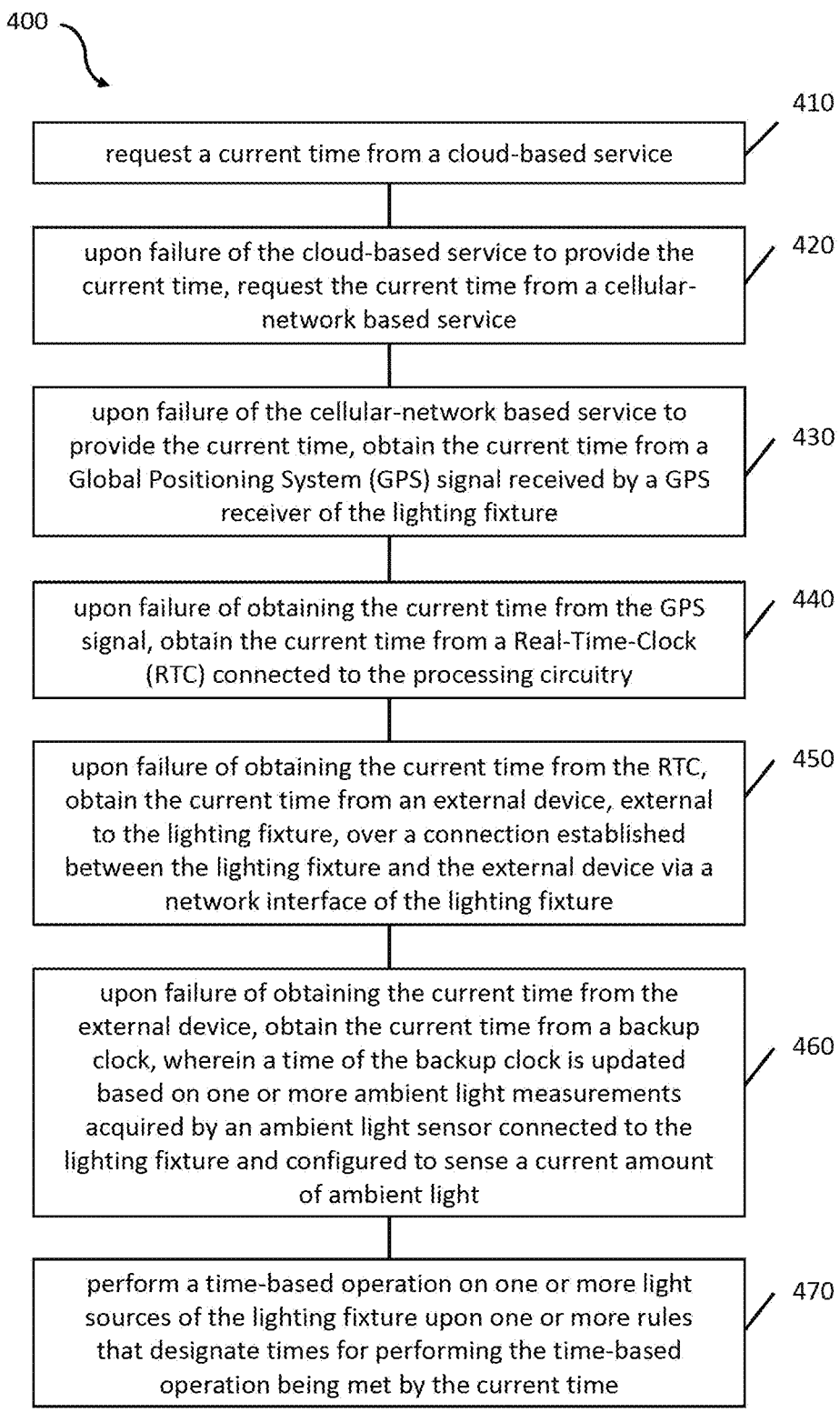
FIG. 4 is a flowchart illustrating one example of a sequence of operations carried out for determining a time using fallback time determination techniques, in accordance with the presently disclosed subject matter.

In embodiments of the presently disclosed subject matter, fewer, more and/or different stages than those shown in FIGS. 2-4 may be executed. In embodiments of the presently disclosed subject matter one or more stages illustrated in FIGS. 2-4 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a lighting fixture time determination system, in accordance with the presently disclosed subject matter.

According to the presently disclosed subject matter, lighting fixture 100 (e.g. a street light) comprises a processing circuitry 110. Processing circuitry 110 can be one or more processing units (e.g. central processing units), microprocessors, microcontrollers or any other computing devices or modules, including multiple and/or parallel and/or distributed processing units, which are adapted to independently or cooperatively process data for controlling relevant resources of the lighting fixture 100 and for enabling operations related to resources of the lighting fixture 100.

The processing resource 110 comprises a lighting fixture control module 120, which can be configured to perform one or more lighting fixture control processes, as further detailed herein, inter alia with respect to FIGS. 2-4.

lighting fixture 100 can further comprise, or be otherwise associated with, a data repository 130 (e.g. a database, a storage system, a memory including Read Only Memory—ROM, Random Access Memory—RAM, or any other type of memory, etc.) configured to store data, including inter alia information of desired times of execution of various operations, etc. Data repository 200 can be further configured to enable retrieval and/or update and/or deletion of the stored data. It is to be noted that in some cases, data repository 130 can be distributed, while the lighting fixture 100 has access to the information stored thereon, e.g. via a network interface 180. Lighting fixture 100 can comprise the network interface 180 enabling connecting the lighting fixture 100 to a communication network and enabling it to send and receive data sent thereto through the communication network.

As further detailed herein, the lighting fixture control processes are time-dependent, in the sense that the processes include operations that are designed to be performed at given times. Thus, the processing circuitry 110 has to determine the current time for performing such operations. For this purpose, lighting fixture 100 can further include one or more of: an ambient light sensor 140 configured to sense a current amount of ambient light, an internal clock 150 (also referred to herein as "backup clock"), a Global Positioning System (GPS) receiver 160, a real-time-clock 170. Each of these components can enable the lighting fixtures' 100 processing circuitry 110 to determine the current time, as further detailed herein.

It is to be noted that although reference is made throughout this description to a lighting fixture 100, it is not thus limited, and the teachings herein can be applied to any device which is designed to perform time-based operations (operations whose execution depends on the time of day).

Turning to FIG. 2, there is shown a flowchart illustrating one example of a sequence of operations carried out for controlling a lighting fixture, in accordance with the presently disclosed subject matter.

According to certain examples of the presently disclosed subject matter, lighting fixture 100 can be configured to perform a lighting fixture control process 200, e.g. utilizing lighting fixture control module 120.

For this purpose, lighting fixture 100 can be configured to determine a current time using a fallback time determination method upon one or more preceding time determination methods failings (block 210). It is to be noted that the fallback time determination method is different than the preceding time determination methods which failed. Accordingly, lighting fixture 100 attempts to determine a current time using one or more time determination method which fail, and then it determines the current time using another time determination method, other than the ones that failed.

After determining the current time, lighting fixture 100 performs a time-based operation on one or more light sources (e.g. Light Emitting Diodes (LEDs)) of the lighting fixture upon one or more rules that designate times for performing the time-based operation being met by the determined current time (block 220). Some exemplary time-based operations include turning at least one of the light sources on, turning at least one of the light sources off, increasing an amount of light emitted by the light sources the light sources, or decreasing an amount of light emitted by the light sources the light sources.

The time determination methods can be, for example:
(a) obtaining the current time from a cloud-based service—the lighting fixture 100 can connect to a cloud-based service via its network interface 180, and request the time therefrom;
(b) obtaining the current time from a cellular-network based service—the lighting fixture 100 can connect to a cellular network-based service (operated by a cellular network operator) via its network interface 180, and request the time therefrom;
(c) obtaining the current time from a Global Positioning System (GPS) signal received by a GPS receiver 160 of the lighting fixture 100 using known methods and techniques;
(d) obtaining the current time from a Real-Time-Clock (RTC) 170 connected to the lighting fixtures' 100 processing circuitry 110;
(e) obtaining the current time from an external device, external to the lighting fixture 100, over a connection established between the lighting fixture and the external device via the network interface 180 of the lighting fixture 100—for example, the network interface 180 can include a Bluetooth transceiver enabling the lighting fixture 100 to communicate with other devices having Bluetooth transceivers, and in such case, the lighting fixture 100 can connect to another Bluetooth device in its vicinity (e.g. an adjacent lighting fixture) and request the time therefrom; or
(f) obtaining the current time from a backup clock, wherein a time of the backup clock (which can optionally be the RTC 170) is updated based on one or more ambient light measurements acquired by an ambient light sensor connected to the lighting fixture and configured to sense a current amount of ambient light, as further detailed herein, with reference to FIG. 3.

It is to be noted that, with reference to FIG. 2, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 3 is a flowchart illustrating one example of a sequence of operations carried out for determining a time using an ambient light sensor, in accordance with the presently disclosed subject matter.

According to certain examples of the presently disclosed subject matter, lighting fixture 100 can be configured to perform an ambient light-based time determination process 3M), e.g. utilizing lighting fixture control module 120.

For this purpose, lighting fixture 100 can be configured to obtain: (a) a current date, and (b) expected amounts of ambient light at the one or more respective known times at a geographical location of the lighting fixture 100 (block 310). The expected amounts of ambient light at the one or more respective known times at a geographical location of the lighting fixture 100 can be pre-loaded to the lighting fixture 100, where it can be stored, for example, on data repository 130. The current date can be obtained from the lighting fixture 100 memory, which may have the information available (e.g. in cases where the lighting fixture temporarily lost connection to another source of information that enables determination thereof), or it can be calculated as part of the ambient light-based time determination process 300.

One exemplary process calculating the current date is based on known lengths of days throughout the year, and the fact that the length of days, in most places around the world, can be identical only twice a year (e.g. at winter time and at summer time), due to the fact that the days grow longer at summertime and shorter at wintertime. Such current date determination process can include obtaining (a) a day lengths table indicative of lengths of days at known dates at the geographical location of the lighting fixture 100 (noting that the day lengths table can be pre-loaded to the lighting fixture 100, where it can be stored, for example, on data repository 130), and (b) a sequence of measurements acquired by the ambient light sensor 140, each indicating a respective amount of ambient light determined by the ambient light sensor 140 at a corresponding timestamp. Then, the sequence of measurements is analyzed in order to determine:
(a) a first change of a trend in the measurements indicative of occurrence of a first sunrise (i.e. a first sub-sequence of the measurements had values that demonstrate a decreasing trend, and then a second sub-sequence of the measurements, following the first sub-sequence of the measurements demonstrated an increasing trend), the first change starting at a first timestamp being the timestamp of the earliest measurement associated with the first change;
(b) a second change of a trend in the measurements indicative of occurrence of first sunset (i.e. the second sub-sequence of the measurements had values that demonstrate an increasing trend, and then a third sub-sequence of the measurements, following the second sub-sequence of the measurements demonstrated a decreasing trend), adjacent to the first change, the second change starting at a second timestamp being the timestamp of the earliest measurement associated with the second change;
(c) a third change of a trend in the measurements indicative of occurrence of a second sunrise (i.e. the third sub-sequence of the measurements had values that demonstrate a decreasing trend, and then a fourth sub-sequence of the measurements, following the first sub-sequence of the measurements demonstrated an increasing trend), the third change starting at a third timestamp being the timestamp of the earliest measurement associated with the third change; and
(d) a fourth change of a trend in the measurements indicative of occurrence of second sunset (i.e. the fourth sub-sequence of the measurements had values that demonstrate an increasing trend, and then a fifth sub-sequence of the measurements, following the fourth sub-sequence of the measurements demonstrated a decreasing trend), adjacent the third change, the fourth change starting at a fourth timestamp being the timestamp of the earliest measurement associated with the fourth change.

Based on these determinations, lighting fixture 100 can determine (a) a first length of day, being the difference between the second timestamp and the first timestamp, and (b) a second length of day, being the difference between the fourth timestamp and the third timestamp. This, in turn, enables determining the current date by comparing the first length of day and the second length of day with the obtained day lengths table. Once a match is identified, the date can be set to be the later date of the matched couple of days in the day lengths table.

In order to better understand the current date determination method detailed herein, let's look at an example. Assuming that the day lengths table indicates that the day length at a given date at a certain known location was nine hours and fifty-four minutes (9:54) and that the day length a day after the given date was nine hours and fifty-six minutes (9:56). Assuming that analysis of the trends in a sequence of measurements acquired by the ambient light sensor 140 correlates with these lengths of days (of yesterday and today), the lighting fixture 100 can determine that today's date is the day after the given date.

Returning to the ambient light-based time determination process 300, in addition to the obtainment of the information detailed with respect to block 310, lighting fixture 100 can determine, using the ambient light sensor, the current amount of ambient light (block 320). Upon the current amount of ambient light being equal to, or within a certain threshold (e.g. a predetermined threshold) from, one of the expected amounts of ambient light set the time of the backup clock to be the respective known time (block 330). Accordingly, if the current amount of light is equal to, or within the threshold from, an expected amount of light at a given time at the geographical location of the lighting fixture 100, the clock can be set according to such given time.

It is to be noted that, with reference to FIG. 3, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Turning to FIG. 4, there is shown a flowchart illustrating one example of a sequence of operations carried out for determining a time using fallback time determination techniques, in accordance with the presently disclosed subject matter.

According to certain examples of the presently disclosed subject matter, lighting fixture 100 can be configured to perform an ambient light-based time determination process 400, e.g. utilizing lighting fixture control module 120.

For this purpose, lighting fixture 100 can be configured to request a current time from a cloud-based service (block 410), e.g. via the network interface 180.

Upon failure of the cloud-based service to provide the current time, lighting fixture 100 can be configured to request the current time from a cellular-network based service (block 420), e.g. via the network interface 180.

Upon failure of the cellular-network based service to provide the current time, lighting fixture 100 can be configured to obtain the current time from a Global Positioning System (GPS) signal received by a GPS receiver of the lighting fixture (block 430), e.g. using known methods and/or techniques.

Upon failure of obtaining the current time from the GPS signal, lighting fixture 100 can be configured to obtain the current time from a Real-Time-Clock (RTC) connected to the processing circuitry (block 440), which continuously monitors the current time.

Upon failure of obtaining the current time from the RTC, lighting fixture 100 can be configured to obtain the current time from an external device, external to the lighting fixture, over a connection established between the lighting fixture and the external device via the network interface 180 of the lighting fixture (block 450). Such external device can be, for example, another lighting fixture located in vicinity to the lighting fixture 100 (e.g. in a distance that enables establishing a connection therebetween noting the type of connection interface (e.g. Bluetooth, Zigbee, WiFi, etc.)).

Upon failure of obtaining the current time from the external device, lighting fixture 100 can be configured to obtain the current time from a backup clock, wherein a time of the backup clock is updated based on expected amounts of ambient light at one or more respective known times at the geographical location of the lighting fixture (block 460), e.g. as detailed herein with reference to FIG. 3 in the context of the ambient light-based time determination process 300.

After determining the current time, lighting fixture 100 performs a time-based operation on one or more light sources (e.g. Light Emitting Diodes (LEDs)) of the lighting fixture upon one or more rules that designate times for performing the time-based operation being met by the determined current time (block 470). Some exemplary time-based operations include turning at least one of the light sources on, turning at least one of the light sources off, increasing an amount of light emitted by the light sources the light sources, or decreasing an amount of light emitted by the light sources the light sources.

It is to be still further noted that, with reference to FIG. 4, some of the blocks can be integrated into a consolidated block or can be broken down to a few blocks and/or other blocks may be added. Furthermore, in some cases, the blocks can be performed in a different order than described herein (e.g. blocks 410-460 can be performed in any order). It is to be further noted that some of the blocks are optional (e.g. any one of blocks 410-460 can potentially be removed as long as at least two of the blocks remain). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A lighting fixture comprising a processing circuitry configured to:
   determine a current time using a fallback time determination method upon one or more preceding time determination methods failings, the fallback time determination method being different than the preceding time determination methods; and
   perform a time-based operation on one or more light sources of the lighting fixture upon one or more rules that designate times for performing the time-based operation being met by the determined current time, wherein the current time is determined using a current date;
   wherein the processing circuitry determines the current date by:
   obtaining (a) a day lengths table indicative of lengths of days at known dates at the geographical location of the lighting fixture, and (b) a sequence of measurements acquired by the ambient light sensor, each indicating a respective amount of ambient light determined by the ambient light sensor at a corresponding timestamp;
   identifying, within the sequence of measurements:
   a. a first change of a trend in the measurements indicative of occurrence of a first sunrise, the first change starting at a first timestamp being the timestamp of the earliest measurement associated with the first change;
   b. a second change of a trend in the measurements indicative of occurrence of first sunset, adjacent to the first change, the second change starting at a second timestamp being the timestamp of the earliest measurement associated with the second change;
   c. a third change of a trend in the measurements indicative of occurrence of a second sunrise, the third change starting at a third timestamp being the timestamp of the earliest measurement associated with the third change;
   d. a fourth change of a trend in the measurements indicative of occurrence of second sunset, adjacent the third change, the fourth change starting at a fourth timestamp being the timestamp of the earliest measurement associated with the fourth change;
   determining (a) a first length of day, being the difference between the second timestamp and the first timestamp, and (b) a second length of day, being the difference between the fourth timestamp and the third timestamp; and
   determining the current date by comparing the first length of day and the second length of day with the day lengths table.

2. The lighting fixture of claim 1, wherein the fallback time determination method is one of the following:
   (a) obtaining the current time from a cloud-based service;
   (b) obtaining the current time from a cellular-network based service;
   (c) obtaining the current time from a Global Positioning System (GPS) signal received by a GPS receiver of the lighting fixture;
   (d) obtaining the current time from a Real-Time-Clock (RTC) connected to the processing circuitry;
   (e) obtaining the current time from an external device, external to the lighting fixture, over a connection established between the lighting fixture and the external device via a network interface of the lighting fixture; or
   (f) obtaining the current time from a backup clock, wherein a time of the backup clock is updated based on one or more ambient light measurements acquired by an ambient light sensor connected to the lighting fixture and configured to sense a current amount of ambient light.

3. The lighting fixture of claim 2, wherein the processing circuitry is further configured to:
   obtain: (a) the current date, and (b) expected amounts of ambient light at the one or more respective known times at a geographical location of the lighting fixture;
   determine, using the ambient light sensor, the current amount of ambient light; and
   upon the current amount of ambient light being equal to, or within a first threshold from, one of the expected amounts of ambient light set the time of the backup clock to be the respective known time.

4. The lighting fixture of claim 3, wherein the known times include one or more of: sunrise time, dawn time, sunset time, or dusk time.

5. The lighting fixture of claim 2, wherein the processing circuitry is further configured to:
   obtain: (a) dawn time and dusk time at a current date at a geographical location of the lighting fixture, and (b) a sequence of measurements acquired by the ambient light sensor, each indicating a respective amount of ambient light determined by the ambient light sensor at a corresponding timestamp;
   identify, within the sequence of measurements a change of a trend;
   upon the trend being an increasing trend, set the time of the backup clock to be the dawn time and upon the trend being a decreasing trend, set the time of the backup clock to be the dusk time.

6. The lighting fixture of claim 1, wherein the preceding time determination methods is one or more of the following:
   (a) obtaining the current time from a cloud-based service;
   (b) obtaining the current time from a cellular-network based service;
   (c) obtaining the current time from a Global Positioning System (GPS) signal received by a GPS receiver of the lighting fixture;
   (d) obtaining the current time from a Real-Time-Clock (RTC) connected to the processing circuitry;
   (e) obtaining the current time from an external device, external to the lighting fixture, over a connection established between the lighting fixture and the external device via a network interface of the lighting fixture; or
   (f) obtaining the current time from a backup clock, wherein a time of the backup clock is updated based on expected amounts of ambient light at one or more respective known times at the geographical location of the lighting fixture.

7. The lighting fixture of claim 6, further comprising an ambient light sensor configured to sense a current amount of ambient light, wherein the processing circuitry is further configured to:
   obtain: (a) a current date, and (b) the expected amounts of ambient light at the one or more respective known times at the geographical location of the lighting fixture;
   determine, using the ambient light sensor, the current amount of ambient light; and
   upon the current amount of ambient light being equal to, or within a first threshold from, one of the expected amounts of ambient light set the time of the backup clock to be the respective known time.

8. The lighting fixture of claim 7, wherein the known times include one or more of: sunrise time, dawn time, sunset time, or dusk time.

9. The lighting fixture of claim 1, wherein the time-based operations are one or more of: turning at least one of the light sources on, turning at least one of the light sources off, increasing an amount of light emitted by the light sources the light sources, or decreasing an amount of light emitted by the light sources the light sources.

10. A method of operating a lighting fixture, the method comprising:
    determining, by a processing circuitry a current time using a fallback time determination method upon one or more preceding time determination methods failings, the fallback time determination method being different than the preceding time determination methods; and
    performing, by the processing circuitry, a time-based operation on one or more light sources of the lighting fixture upon one or more rules that designate times for performing the time-based operation being met by the determined current time, wherein the determined current time is determined using a current date;
    wherein the processing circuitry is configured to determine the current date by:
        obtaining (a) a day lengths table indicative of lengths of days at known dates at the geographical location of the lighting fixture, and (b) a sequence of measurements acquired by the ambient light sensor, each indicating a respective amount of ambient light determined by the ambient light sensor at a corresponding timestamp;
        identifying, within the sequence of measurements:
        a. a first change of a trend in the measurements indicative of occurrence of a first sunrise, the first change starting at a first timestamp being the timestamp of the earliest measurement associated with the first change;
        b. a second change of a trend in the measurements indicative of occurrence of first sunset, adjacent to the first change, the second change starting at a second timestamp being the timestamp of the earliest measurement associated with the second change;
        c. a third change of a trend in the measurements indicative of occurrence of a second sunrise, the third change starting at a third timestamp being the timestamp of the earliest measurement associated with the third change;
        d. a fourth change of a trend in the measurements indicative of occurrence of second sunset, adjacent the third change, the fourth change starting at a fourth timestamp being the timestamp of the earliest measurement associated with the fourth change;
        determining (a) a first length of day, being the difference between the second timestamp and the first timestamp, and (b) a second length of day, being the difference between the fourth timestamp and the third timestamp; and
        determining the current date by comparing the first length of day and the second length of day with the day lengths table.

11. The method of claim 10, wherein the fallback time determination method is one of the following:
    (a) obtaining the current time from a cloud-based service;
    (b) obtaining the current time from a cellular-network based service;
    (c) obtaining the current time from a Global Positioning System (GPS) signal received by a GPS receiver of the lighting fixture;
    (d) obtaining the current time from a Real-Time-Clock (RTC) connected to the processing circuitry;
    (e) obtaining the current time from an external device, external to the lighting fixture, over a connection established between the lighting fixture and the external device via a network interface of the lighting fixture; or
    (f) obtaining the current time from a backup clock, wherein a time of the backup clock is updated based on one or more ambient light measurements acquired by an ambient light sensor connected to the lighting fixture and configured to sense a current amount of ambient light.

12. The method of claim 11, further comprising:
    obtaining, by the processing circuitry: (a) the current date, and (b) expected amounts of ambient light at the one or more respective known times at a geographical location of the lighting fixture;
    determining, by the processing circuitry, using the ambient light sensor, the current amount of ambient light; and
    upon the current amount of ambient light being equal to, or within a first threshold from, one of the expected amounts of ambient light, setting, by the processing circuitry, the time of the backup clock to be the respective known time.

13. The method of claim 12, wherein the known times include one or more of: sunrise time, dawn time, sunset time, or dusk time.

14. The method of claim 11, further comprising:
    obtaining, by the processing circuitry: (a) dawn time and dusk time at a current date at a geographical location of the lighting fixture, and (b) a sequence of measurements acquired by the ambient light sensor, each indicating a respective amount of ambient light determined by the ambient light sensor at a corresponding timestamp;
    identifying, by the processing circuitry, within the sequence of measurements a change of a trend;
    upon the trend being an increasing trend, setting, by the processing circuitry, the time of the backup clock to be the dawn time and upon the trend being a decreasing trend, set the time of the backup clock to be the dusk time.

15. The method of claim 10, wherein the preceding time determination methods is one or more of the following:
    (a) obtaining the current time from a cloud-based service;
    (b) obtaining the current time from a cellular-network based service;
    (c) obtaining the current time from a Global Positioning System (GPS) signal received by a GPS receiver of the lighting fixture;
    (d) obtaining the current time from a Real-Time-Clock (RTC) connected to the processing circuitry;
    (e) obtaining the current time from an external device, external to the lighting fixture, over a connection established between the lighting fixture and the external device via a network interface of the lighting fixture; or
    (f) obtaining the current time from a backup clock, wherein a time of the backup clock is updated based on expected amounts of ambient light at one or more respective known times at the geographical location of the lighting fixture.

16. The method of claim 15, wherein the lighting fixture comprises an ambient light sensor configured to sense a current amount of ambient light, the method further comprising:

obtaining, by the processing circuitry: (a) a current date, and (b) the expected amounts of ambient light at the one or more respective known times at the geographical location of the lighting fixture;

determining, by the processing circuitry, using the ambient light sensor, the current amount of ambient light; and upon the current amount of ambient light being equal to, or within a first threshold from, one of the expected amounts of ambient light, setting, by the processing circuitry, the time of the backup clock to be the respective known time.

17. The method of claim 10, wherein the time-based operations are one or more of: turning at least one of the light sources on, turning at least one of the light sources off, increasing an amount of light emitted by the light sources the light sources, or decreasing an amount of light emitted by the light sources the light sources.

18. A non-transitory computer readable storage medium having computer readable program code embodied therewith, the computer readable program code, executable by a processing circuitry to perform a method of operating a lighting fixture, the method comprising:

determining, by the processing circuitry, a current time using a fallback time determination method upon one or more preceding time determination methods failings, the fallback time determination method being different than the preceding time determination methods; and performing, by the processing circuitry, a time-based operation on one or more light sources of the lighting fixture upon one or more rules that designate times for performing the time-based operation being met by the determined current time, wherein the determined current time is determined using a current date;

wherein the processing circuitry is configured to determine the current date by:

obtaining (a) a day lengths table indicative of lengths of days at known dates at the geographical location of the lighting fixture, and (b) a sequence of measurements acquired by the ambient light sensor, each indicating a respective amount of ambient light determined by the ambient light sensor at a corresponding timestamp;

identifying, within the sequence of measurements:

a. a first change of a trend in the measurements indicative of occurrence of a first sunrise, the first change starting at a first timestamp being the timestamp of the earliest measurement associated with the first change;

b. a second change of a trend in the measurements indicative of occurrence of first sunset, adjacent to the first change, the second change starting at a second timestamp being the timestamp of the earliest measurement associated with the second change;

c. a third change of a trend in the measurements indicative of occurrence of a second sunrise, the third change starting at a third timestamp being the timestamp of the earliest measurement associated with the third change;

d. a fourth change of a trend in the measurements indicative of occurrence of second sunset, adjacent the third change, the fourth change starting at a fourth timestamp being the timestamp of the earliest measurement associated with the fourth change;

determining (a) a first length of day, being the difference between the second timestamp and the first timestamp, and (b) a second length of day, being the difference between the fourth timestamp and the third timestamp; and determining the current date by comparing the first length of day and the second length of day with the day lengths table.

* * * * *